United States Patent
Niemi et al.

(10) Patent No.: US 10,616,114 B2
(45) Date of Patent: Apr. 7, 2020

(54) CONGESTION CONTROL HANDLING BETWEEN COMMUNICATION APPARATUS AND NETWORK

(71) Applicant: MediaTek Singapore Pte. Ltd., Singapore (SG)

(72) Inventors: Marko Niemi, Oulu (FI); Mika Kaikkonen, Oulu (FI)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 105 days.

(21) Appl. No.: 15/627,610

(22) Filed: Jun. 20, 2017

(65) Prior Publication Data

US 2017/0289042 A1   Oct. 5, 2017

Related U.S. Application Data

(60) Provisional application No. 62/362,076, filed on Jul. 14, 2016.

(51) Int. Cl.

| | |
|---|---|
| H04W 48/06 | (2009.01) |
| H04W 74/08 | (2009.01) |
| H04L 12/851 | (2013.01) |
| H04L 12/801 | (2013.01) |
| H04W 28/02 | (2009.01) |
| H04L 12/855 | (2013.01) |

(52) U.S. Cl.
CPC ............. *H04L 47/12* (2013.01); *H04L 47/24* (2013.01); *H04L 47/2466* (2013.01); *H04W 28/0215* (2013.01); *H04W 48/06* (2013.01); *H04W 74/085* (2013.01); *H04W 74/0833* (2013.01)

(58) Field of Classification Search
CPC ............. H04W 76/18; H04W 28/0289; H04W 74/085; H04W 76/38
See application file for complete search history.

(56) References Cited

U.S. PATENT DOCUMENTS

| | | | |
|---|---|---|---|
| 2013/0201870 A1* | 8/2013 | Gupta | H04W 4/70 370/254 |
| 2015/0256961 A1* | 9/2015 | Kim | H04W 74/085 370/329 |
| 2016/0113053 A1* | 4/2016 | Chuang | H04W 76/18 370/329 |
| 2017/0289042 A1* | 10/2017 | Niemi | H04L 47/12 |

FOREIGN PATENT DOCUMENTS

TW        201230852 A1    7/2012

OTHER PUBLICATIONS

Taiwan Intellectual Property Office, Office Action for Taiwan Patent Application No. 106123177, dated Jul. 25, 2018.

* cited by examiner

*Primary Examiner* — Raj Jain
(74) *Attorney, Agent, or Firm* — Han IP PLLC; Andy M. Han

(57) ABSTRACT

Methods and apparatuses pertaining to congestion control handling between a communication apparatus and a network apparatus. The communication apparatus may transmit a request message to the network apparatus. The network apparatus may transmit a reject message with a back-off timer value and a back-off priority indication to the communication apparatus. The communication apparatus may determine whether to send a further request message to the network apparatus according to the back-off priority indication.

16 Claims, 6 Drawing Sheets

CONGESTION CONTROL HANDLING BETWEEN COMMUNICATION APPARATUS AND NETWORK

CROSS REFERENCE TO RELATED PATENT APPLICATION(S)

The present disclosure is part of a non-provisional application claiming the priority benefit of U.S. Patent Application No. 62/362,076, filed on 14 Jul. 2016, which is incorporated by reference in its entirety.

TECHNICAL FIELD

The present disclosure is generally related to congestion control handling and, more particularly, to back-off mechanism between communication apparatus and networks.

BACKGROUND

Unless otherwise indicated herein, approaches described in this section are not prior art to the claims listed below and are not admitted to be prior art by inclusion in this section.

There are various well-developed and well-defined cellular communications technologies in telecommunications that enable wireless communications using mobile terminals, or user equipment (UE). For example, the Global System for Mobile communications (GSM) is a well-defined and commonly used communications system, which uses time division multiple access (TDMA) technology, which is a multiplex access scheme for digital radio, to send voice, video, data, and signaling information (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Long-Term Evolution (LTE), as well as its derivatives such as LTE-Advanced and LTE-Advanced Pro, is a standard for high-speed wireless communication for mobile phones and data terminals.

In coming next generation communication technologies such as 5G and Internet of Things (IoT), a huge number of devices which can communicate with networks will explode. In addition to human use devices like mobile phones, tablets, or laptops, more and more machine type devices will be also connected to networks. These machine type devices may include, for example and not limited to, smart thermostat, smart fridge, smart doorlock, wireless speaker, home control center, etc.

When a large number of machine type devices are connected to networks and also request services, network traffic will increase significantly and network nodes will become very busy and be in serious congestion. The signaling from machine type devices may also occupy a lot of radio resources. Therefore, congestion control handling and back-off mechanism between network nodes and communication devices is needed to properly distribute massive requests from all types of communication devices.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues with respect to congestion control handling on a network node due to signaling from a number of communication devices.

In one aspect, a method may involve a communication apparatus receiving a reject message with a back-off timer value and a back-off priority indication. The method may also involve the communication apparatus determining whether to send a request message according to the back-off priority indication. The back-off priority indication indicates a level of priority to apply the back-off timer value.

In another aspect, a communication apparatus may include a transceiver capable of wirelessly communicating with a network apparatus. The communication apparatus may also include a processor. The processor may be capable of receiving a reject message with a back-off timer value and a back-off priority indication. The processor may be also capable of determining whether to send a request message according to the back-off priority indication. The back-off priority indication indicates a level of priority to apply the back-off timer value.

In one aspect, a method may involve a network apparatus determining a back-off timer value and a back-off priority indication. The method may also involve the network apparatus including the back-off timer value and the back-off priority indication in a reject message. The method may also involve the network apparatus transmitting the reject message to a communication apparatus. The back-off priority indication indicates a level of priority to apply the back-off timer value.

In another aspect, a network apparatus may include a transceiver capable of wirelessly communicating with a communication apparatus. The communication apparatus may also include a processor. The processor may be capable of determining a back-off timer value and a back-off priority indication. The processor may be also capable of including the back-off timer value and the back-off priority indication in a reject message. The processor may be also capable of transmitting the reject message to a communication apparatus. The back-off priority indication indicates a level of priority to apply the back-off timer value.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.
Overview In a new generation communication network (e.g., a New Radio (NR) network, a 5G network or an Internet of Things (IoT) network), a number of communication devices may be operated in dual priority for establishing a connection with networks. For example, some communication devices may be configured as a low priority device with applications running on it. Those applications may be able to override the priority configuration, change the priority from low priority to normal priority and require normal priority access to networks.

Figure 1:
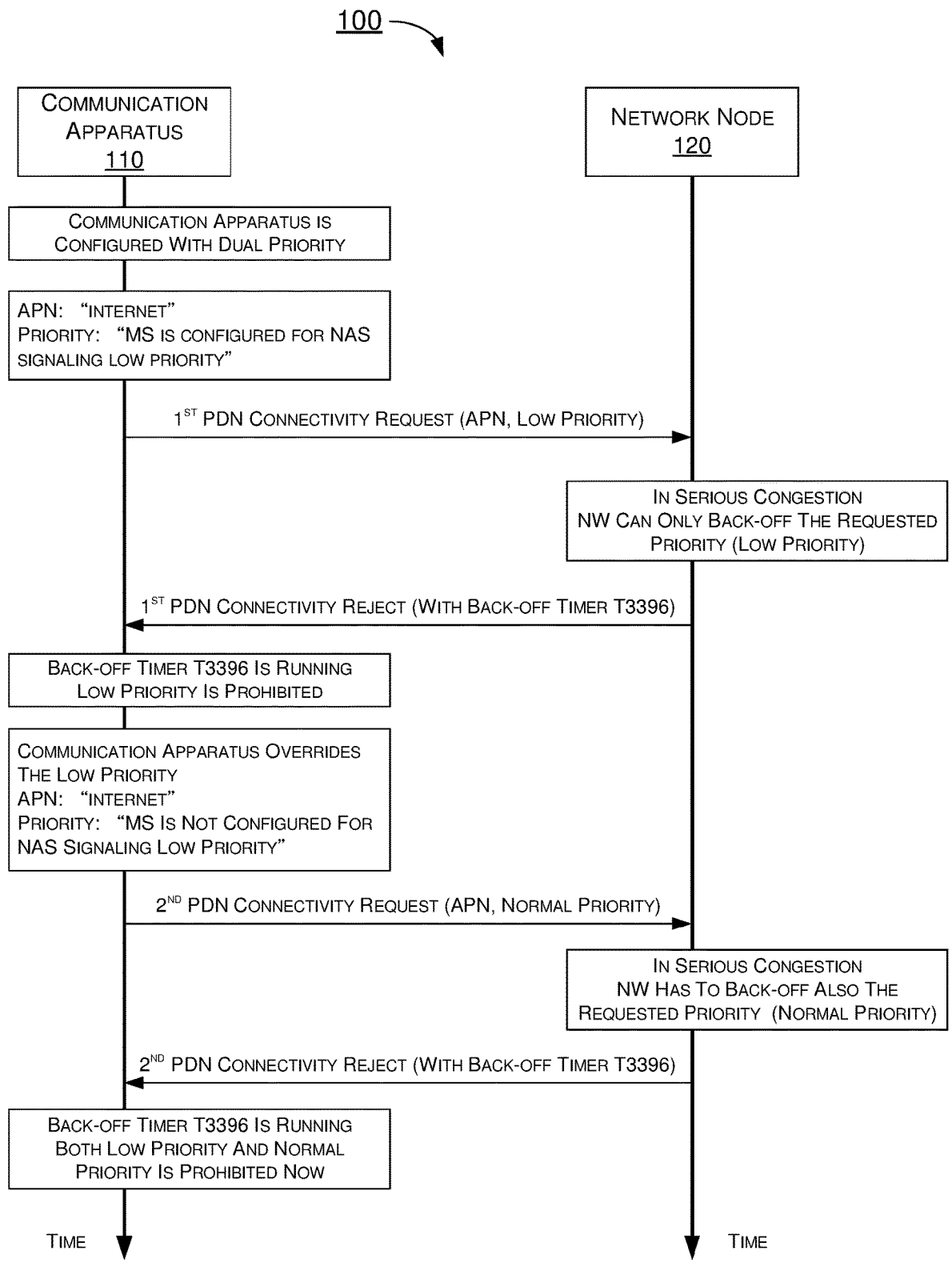
FIG. 1 is a diagram depicting an example scenario for requiring access by a communication apparatus with dual priority.

FIG. 1 illustrates an example scenario 100 for requiring access by a communication apparatus with dual priority. Scenario 100 involves a communication apparatus 110 and a network node 120, which may be part of a wireless network (e.g., a LTE network, a LTE-Advanced network or a LTE-Advanced Pro network). Communication apparatus 110 is configured with dual priority. This means that communication apparatus 110 is able to acquire access to network node 120 with either low priority or normal priority. At first, communication apparatus 110 send a first request message (e.g., Public Data Network (PDN) connectivity request) with parameters of Access Point Name (APN) and priority to network node 120. The APN is configured as "internet" and the priority is configured as "Mobile Station (MS) is configured for Non-Access Stratum (NAS) signaling low priority". Network node 120 is in serious congestion at this moment and should back-off the request. Then network node 120 send a first reject message (e.g., PDN connectivity reject) with a back-off timer value T3396 to communication apparatus 110. When network node 120 is in serious congestion, network node 120 should back-off communication apparatus with any priority. However, network node 120 can back-off only the requested priority which is low priority in this example. Because network node 120 is not able to specify a level of priority which the back-off timer value T3396 should apply to.

After receiving the first reject message (e.g., PDN connectivity reject), the back-off timer T3396 is running at communication apparatus 110. Before the back-off timer T3396 is expired, communication apparatus 110 is prohibited from sending a request message (e.g., PDN connectivity request) with low priority to network node 120. Accordingly, an application on communication apparatus 110 may override the low priority configuration and change the priority level from low priority to normal priority. Communication apparatus 110 then send a second request message (e.g., PDN connectivity request) with parameters of APN and priority to network node 120. The APN is configured as "internet" and the priority is configured as "MS is not configured for NAS signaling low priority" which refers to normal priority. Network node 120 is still in serious congestion at this moment and should also back-off the request. Network node 120 send a second reject message (e.g., PDN connectivity reject) with a back-off timer value T3396 to communication apparatus 110. Network node 120 now also back-off the requested priority which is normal priority. After receiving the second reject message (e.g., PDN connectivity reject), the back-off timer T3396 is running at communication apparatus 110. Now communication apparatus 110 is prohibited from sending a request message (e.g., PDN connectivity request) for both low priority and normal priority to network node 120.

In example scenario 100, although network node 120 can back-off a communication apparatus requesting a PDN connection with low priority, network node 120 also can back-off a communication apparatus requesting a PDN connection with normal priority. For a dual priority device like communication apparatus 110, network node 120 needs to back-off and send a PDN connectivity reject message to the same device twice. If a huge number of communication apparatus are capable of dual priority and operated in certain areas, too much signaling will be produced and sent to network nodes. Network nodes may be burst and become more congested. Network nodes do not have an efficient mechanism to distinguish the normal priority traffic caused by mobile phones from the normal priority traffic caused by machine type devices. If PDN connections with normal priority were activated by those devices, mobility management procedures including normal tracking area update, periodic tracking area update and system changes may also be performed if those devices also support multiple radio access technologies (RAT) like GSM, UMTS and LTE. The capacity and resources of network nodes will be occupied by those devices.

Accordingly, the current back-off mechanism is not designed for the upcoming IoT or machine type devices since a huge number of low priority machines may also have capability to establish normal priority connections. This can be used by those machine type devices as a back-up mechanism to overcome the network initiated traffic throttling for low priority traffic. If a big number of those machine type devices activates normal priority PDN connections by overriding the low priority indicator as a back-up plan, it means that those machine type devices will steal and occupy network capacity from human operated smart phones and devices operating with normal priority. The smart phone users will suffer due to machine type communications with normal priority.

Figure 2:
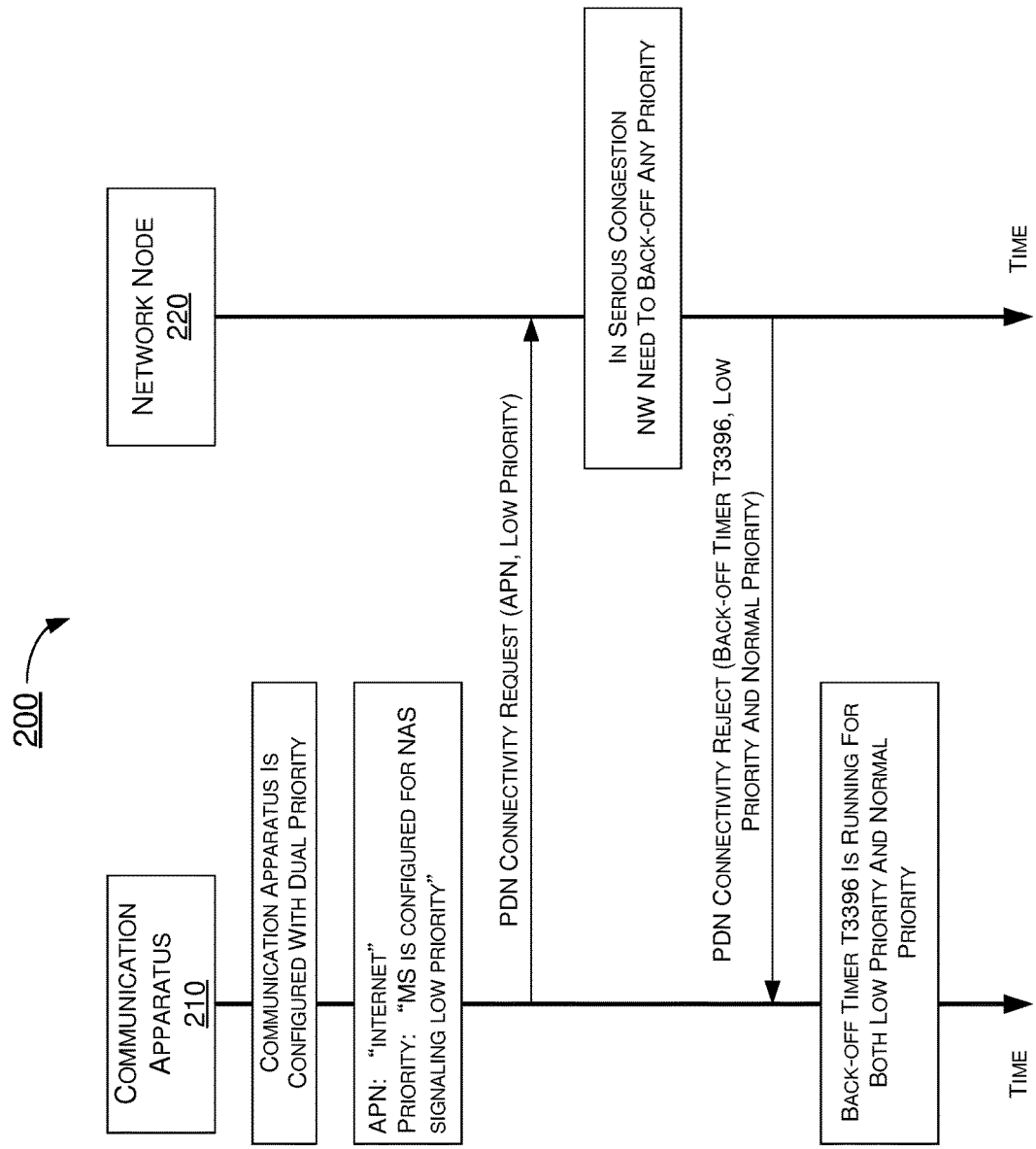
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a communication apparatus 210 and a network node 220, which may be part of a wireless network (e.g., a LTE network, a LTE-Advanced network, a LTE-Advanced Pro network, a 5G network, an IoT network or a New Radio network). Communication apparatus 210 is capable of dual priority. This means that communication apparatus 210 can acquire access to network node 220 with either low priority or normal priority. As showed in FIG. 2, communication apparatus 210 send a request message (e.g., PDN Connectivity Request) with parameters of APN and priority to network node 220. The APN is configured as "internet" and the priority is configured as "MS is configured for NAS signaling low priority". Network node 220 is in serious congestion at this moment and should back-off any priority of request. Then network node 220 send a reject message (e.g., PDN Connectivity Reject) with a back-off timer value T3396 and a back-off priority indication to communication apparatus 210. The back-off priority indication is used to indicate a level of priority to apply the back-off timer value T3396.

After receiving the reject message (e.g., PDN Connectivity Reject), communication apparatus 210 can determine whether to send a further request message with a higher priority according to the back-off priority indication. In this example, the back-off priority indication indicates both low priority and normal priority. This means that the back-off timer T3396 is applied to both low priority devices and normal priority devices. If communication apparatus 210 change its priority level and send a request message with normal priority, it will still receive a reject message from network node 220. Communication apparatus 210 is prohibited from sending a request message with either low priority or normal priority before the back-off timer T3396 is expired. Accordingly, communication apparatus 210 can determine not to send a further request message.

With the back-off priority indication, network node 220 can specify a priority level it should back-off based on traffic loading of network node 220. If network node 220 is in serious congestion, it can back-off both low priority and normal priority at once by sending only one reject message. Those machine type devices with dual priority will not send a second request message to try a request with normal priority. As such, signaling amount can be reduced and network resources can be saved.

In another example, if a reject message received from network node 220 does not indicate normal priority (i.e., only indicate low priority) in the back-off priority indication, this means that the back-off timer T3396 does not applied to normal priority apparatus. Communication apparatus 210 still can determine to send a request message with a priority indicator set to normal priority to network node 220.

In some implementations, a new indication (i.e., back-off priority indication) in a response message (e.g., a reject message) provided for a network node to indicate what level of priority for back-off can be configured in a new information element (IE) or in an existing IE. A new IE can be either a protocol specific or a common IE for all NAS protocol layers. For backward capability consideration, the new IE can be optional and therefore be possibly ignored by old devices. An existing IE can be a spare bit in use. Possible existing IE candidates could be, for example and without limitation, an extended EMM cause IE, a device properties IE or a re-attempt indicator IE.

The back-off priority indication is used to indicate a level of priority to apply the back-off timer value and may be used to indicate, for example and without limitation, low priority, both low priority and normal priority, or any priority. When the back-off priority indication is set to any priority, it means all types of priority level should be back-off. The low priority indicator may be set to, for example and without limitation, "low priority", "MS is configured for NAS low priority" or "communication apparatus is configured for low priority". The normal priority indicator may be set to, for example and without limitation, "not low priority", "normal priority", "MS is not configured for NAS low priority", "MS is configured for NAS normal priority", "communication apparatus is not configured for low priority" or "communication apparatus is configured for normal priority".

Network nodes may configure only one back-off timer value for both low priority and normal priority if a back-off priority indication indicates both low priority and normal priority. Network nodes may also configure multiple back-off timer values for multiple priority levels. For example, network nodes may configure a first back-off timer value for low priority and a second back-off timer value for normal priority. The first back-off timer value and the second back-off timer value can be identical or can be different.

In other scenarios, a request message sent from communication apparatus 210 to network node 220 include but not be limited to an EPS Mobility Management (EMM) message such as an attach request message, a tracking area update (TAU) message, a routing area update (RAU) message or a service request (SR) message and an EPS Session Management (ESM) message such as a PDN connectivity request message, a bearer resource modification request message, a bearer resource allocation request message. These messages may also be configured to carry a priority indicator indicating either low priority (e.g., MS is configured for NAS low priority) or normal priority (e.g., MS is not configured for NAS low priority) in a device properties IE. Network nodes, in response to these messages, may also send a response message (e.g., a reject message) with a back-off priority indication according to the implementations of the present disclosure.

Figure 3:
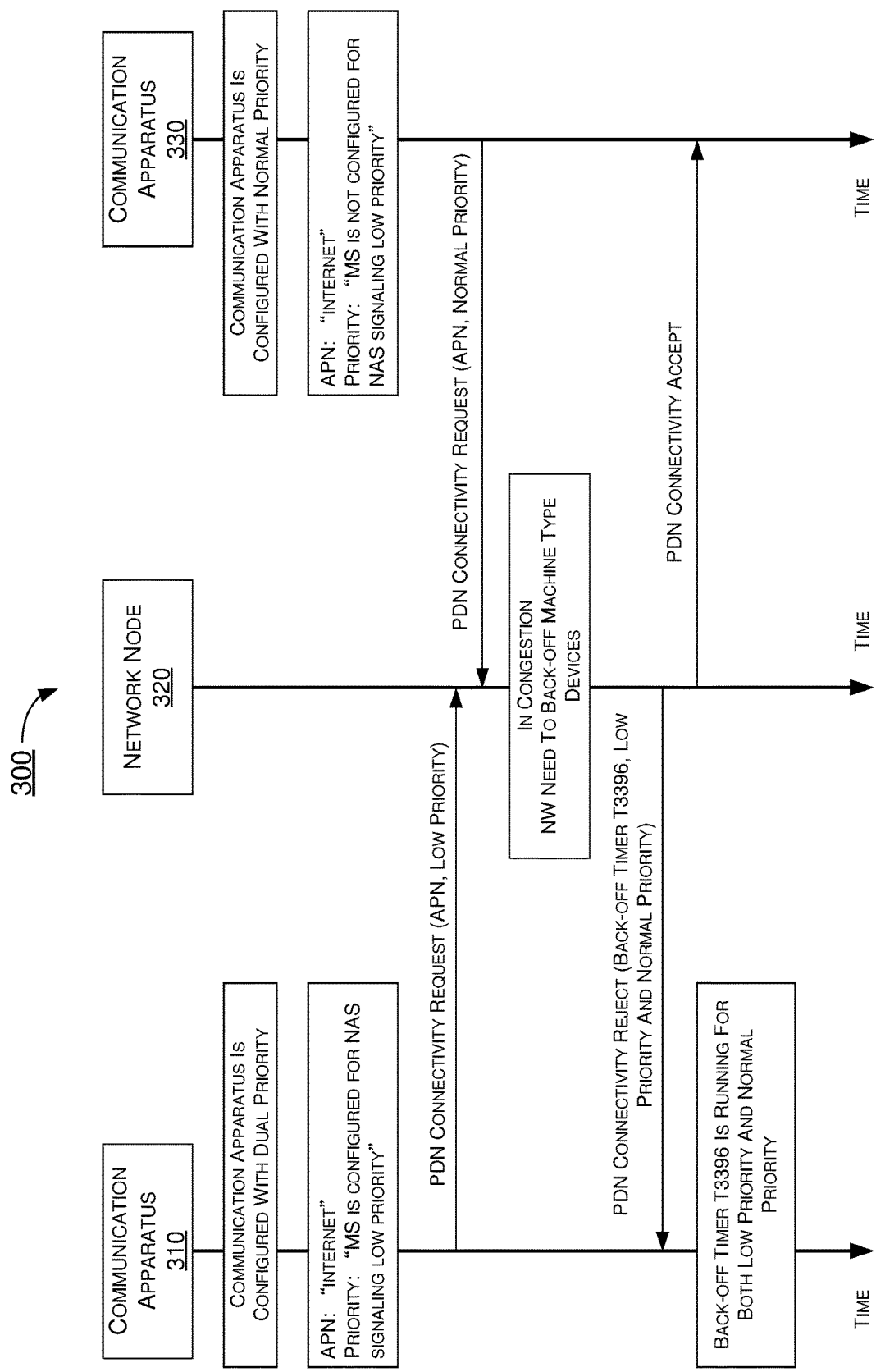
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a communication apparatus 310, a communication apparatus 330 and a network node 320, which may be part of a wireless network (e.g., a LTE network, a LTE-Advanced network, a LTE-Advanced Pro network, a 5G network, an IoT network or a New Radio network). Communication apparatus 310 is a machine type device and is configured with dual priority. This means that communication apparatus 310 can acquire access to network node 320 with either low priority or normal priority. Communication apparatus 330 is a human operated device (e.g., a smart phone) and is configured with normal priority. As showed in FIG. 3, communication apparatus 310 send a request message (e.g., PDN Connectivity Request) with parameters of APN and priority to network node 30. The APN is configured as "internet" and the priority is configured as "MS is configured for NAS signaling low priority". Communication apparatus 330 also send a request message (e.g., PDN Connectivity Request) with parameters of APN and priority to network node 320. The APN is configured as "internet" and the priority is configured as "MS is not configured for NAS signaling low priority" (i.e., normal priority).

Network node 320 is in congestion at this moment and should back-off requests from machine type devices. Since the request message from communication apparatus 310 is configured with low priority, network node 320 determines that communication apparatus 310 belongs to a machine type device and send a reject message (e.g., PDN Connectivity Reject) with a back-off timer value T3396 and a back-off priority indication to communication apparatus 310. The back-off priority indication indicates both low priority and normal priority to prevent communication apparatus 310 from sending a second request message with a higher priority. The request message from communication apparatus 330 is configured with normal priority, network node 320 determines that communication apparatus 330 belongs to a human operated device and send an accept message (e.g., PDN Connectivity Accept) to communication apparatus 330. After receiving the reject message (e.g., PDN Connectivity Reject) at communication apparatus 310, the back-off timer T3396 is running for both low priority and normal priority. Communication apparatus 310 is prohibited from sending a request message with either low priority or normal priority before the back-off timer T3396 is expired.

As such, network node 320 can distinguish the request messages caused by machine type devices from the request messages caused by human operated devices. When network node 320 is busy, it can determine to handle the request messages from human operated devices first and back-off the request messages from machine type devices. With the back-off priority indication, machine type devices with dual priority can be efficiently backed-off and network resources can be preserved for human operated devices.

Illustrative Implementations

Figure 4:
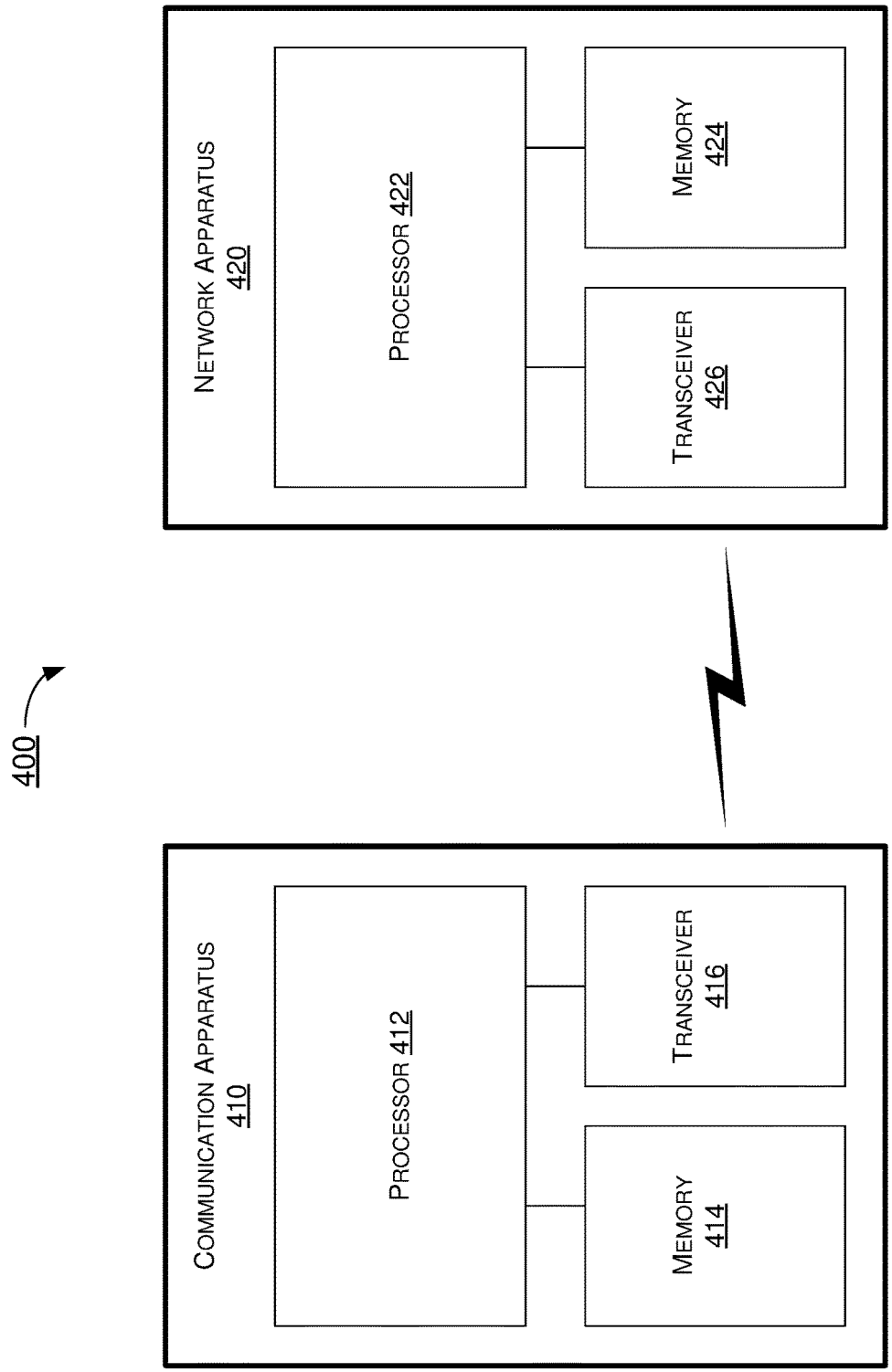
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to congestion control handling and back-off mechanism between a communication apparatus and a network, including scenarios 200 and 300 described above as well as processes 500 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT apparatus such as an immobile or a stationary apparatus, a home apparatus, a wire communication apparatus or a computing apparatus. For instance, communication apparatus 410 may be implemented in a smart thermostat, a smart fridge, a smart doorlock, a wireless speaker or a home control center. Alternatively, communication apparatus 610 may be implemented in the form of one or more integrated-circuit (IC) chips such as, for example and without limitation, one or more single-core processors, one or more multi-core processors, or one or more complex-instruction-set-computing (CISC) processors. In scenarios 100, 200 and 300, communication apparatus 410 may be implemented in or as communication apparatus 110, 210, 310 or 330. Communication apparatus 410 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in a LTE, LTE-Advanced or LTE-Advanced Pro network or in a gNB in a 5G, NR or IoT network. Alternatively, network apparatus 420 may be implemented in the form of one or more IC chips such as, for example and without limitation, one or more single-core processors, one or more multi-core processors, or one or more CISC processors. In scenarios 100, 200 and 300, network apparatus 410 may be implemented in or as network node 120, 220 or 320. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including congestion control handling and back-off mechanism between a device (e.g., communication apparatus 410) and a network (e.g., as represented by network apparatus 420) in accordance with various implementations of the present disclosure.

In some implementations, communication apparatus 412 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a LTE/LTE-Advanced/LTE-Advanced Pro environment in which communication apparatus 410 is implemented in or as a communication apparatus or a UE and network apparatus 420 is implemented in or as a network node of a LTE/LTE-Advanced/LTE-Advanced Pro network.

The following description pertains to the operations, functionalities and capabilities of communication apparatus 410.

In some implementations, communication apparatus 410 may be configured with dual priority. This means that communication apparatus 410 is able to acquire access to a network apparatus with either low priority or normal priority. Processor 412 may be configured to perform a number of other operations. For instance, processor 412 may transmit, via transceiver 416, a first request message with parameters of APN and priority to the network apparatus. The APN is configured as "internet" and the priority is configured as low priority (e.g., "MS is configured for NAS signaling low priority"). Processor 410 may also receive, via transceiver 416, a first reject message with a back-off timer value T3396 from the network apparatus. Processor 412 may be configured to store the back-off timer value T3396 in memory 414 and initiate a timer T3396 with the back-off timer value T3396. Before the back-off timer T3396 is expired, communication apparatus 410 is configured not to send a request message with low priority to the network apparatus. Processor 412 may be further configured to override the low priority configuration, change the priority level from low priority to normal priority and send a second request message with parameters of APN and priority to the network apparatus. The APN is configured as "internet" and the priority is configured as "MS is not configured for NAS signaling low priority" which refers to normal priority. Processor 410 may further receive, via transceiver 416, a second reject message with a back-off timer value T3396 from the network apparatus. Processor 412 may be configured to store the back-off timer value T3396 in memory 414 and initiate a timer T3396 with the back-off timer value T3396. Before the back-off timer T3396 is expired, communication apparatus 410 is configured not to send a request message with either low priority or normal priority to the network apparatus.

Alternatively or additionally, processor 410 may be configured to further perform a number of other operations. For instance, processor 412 may transmit, via transceiver 416, a request message with parameters of APN and priority to the network apparatus. The APN is configured as "internet" and the priority is configured as "MS is configured for NAS signaling low priority". Processor 410 may receive, via transceiver 416, a reject message with a back-off timer value T3396 and a back-off priority indication from the network apparatus. The back-off priority indication indicates a level of priority to apply the back-off timer value T3396. Processor 412 may be configured to store the back-off timer value T3396 in memory 414 and initiate a timer T3396 with the back-off timer value T3396. After receiving the reject message, Processor 412 may be configured to determine whether to send a further request message with a higher priority according to the back-off priority indication.

In some implementations, the back-off priority indication indicates both low priority and normal priority. This means that the back-off timer T3396 is applied to both low priority devices and normal priority devices. Processor 412 may be configured to determine not to send a further request message to the network apparatus before the back-off timer T3396 is expired when the back-off priority indication indicates both low priority and normal priority.

In some implementations, the back-off priority indication indicates any priority. This means that the back-off timer T3396 is applied to all types of priority level. Processor 412 may be configured to determine not to send a further request message to the network apparatus before the back-off timer T3396 is expired when the back-off priority indication indicates any priority.

In some implementations, the back-off priority indication does not indicate normal priority (i.e., only indicate low priority). This means that the back-off timer T3396 does not applied to normal priority apparatus. Processor 412 may be configured to determine to send a further request message with a normal priority indication to the network apparatus when the back-off priority indication does not indicate normal priority.

In some implementations, the low priority indicator may be set to, for example and without limitation, "low priority", "MS is configured for NAS low priority" or "communication apparatus is configured for low priority". The normal priority indicator may be set to, for example and without limitation, "not low priority", "normal priority", "MS is not configured for NAS low priority", "MS is configured for NAS normal priority", "communication apparatus is not configured for low priority" or "communication apparatus is configured for normal priority".

In some implementations, communication apparatus 410 may receive only one back-off timer value for both low priority and normal priority if a back-off priority indication indicates both low priority and normal priority. In other implementations, communication apparatus 410 may receive multiple back-off timer values for multiple priority levels. For example, communication apparatus 410 may receive a first back-off timer value for low priority and a second back-off timer value for normal priority. The first back-off timer value and the second back-off timer value may be identical or may be different.

In some implementations, a request message sent by communication apparatus 410 may include but not be limited to an EPS Mobility Management (EMM) message such as an attach request message, a tracking area update (TAU) message, a routing area update (RAU) message or a service request (SR) message and an EPS Session Management (ESM) message such as a PDN connectivity request message, a bearer resource modification request message, a bearer resource allocation request message. These messages may also be configured to carry a priority indicator indicating either low priority (e.g., MS is configured for NAS low priority) or normal priority (e.g., MS is not configured for NAS low priority) in a device properties IE. In response to these request messages, communication apparatus 410 may receive a response message (e.g., a reject message) with a back-off priority indication according to the implementations of the present disclosure.

The following description pertains to the operations, functionalities and capabilities of network apparatus 420.

In some implementations, processor 412 may be configured to perform a number of operations. For instance, network apparatus 420 may receive, via transceiver 426, a request message from a communication apparatus. The request message may comprise parameters of APN and priority. The APN may be configured as "internet" and the priority may be configured as low priority (e.g., "MS is configured for NAS signaling low priority"). Processor 412 may be configured to determine a back-off timer value and a back-off priority indication according to the work load of network apparatus 420. The back-off priority indication is used to indicate a level of priority to apply the back-off timer value. Processor 412 may further be configured to include the back-off timer value and the back-off priority indication in a reject message and transmit the reject message, via transceiver 426, to the communication apparatus.

In some implementations, when network apparatus 420 is busy and is in serious congestion, processor 412 may be configured to determine that the back-off priority indication indicates both low priority and normal priority. This means that the back-off timer value is applied to both low priority devices and normal priority devices. The communication apparatus is prohibited from sending a further request message to network apparatus 420 before the back-off timer is expired.

In some implementations, processor 412 may be configured to determine that the back-off priority indication indicates any priority. This means that the back-off timer value is applied to all types of priority level. The communication apparatus is prohibited from sending a further request message to network apparatus 420 before the back-off timer is expired.

In some implementations, when network apparatus 420 is busy but still can handle request messages with normal priority, processor 412 may be configured to determine that the back-off priority indication does not indicate normal priority (i.e., only indicate low priority). This means that the back-off timer value does not applied to normal priority apparatus. The communication apparatus is able to send a request message with normal priority to network apparatus 420.

In some implementations, network apparatus 420 may receive a first request message with low priority from a first communication apparatus and receive a second request message with normal priority from a second communication apparatus. Processor 422 may be configured to determine that the first communication apparatus is a machine type device and transmit a reject message, via transceiver 426, to the first communication apparatus. The reject message includes a back-off timer value and a back-off priority indication indicating both low priority and normal priority. Processor 422 may be configured to determine that the second communication apparatus is a human operated device and transmit an accept message, via transceiver 426, to the second communication apparatus.

In some implementations, the back-off priority indication may indicate, for example and without limitation, "low priority", "MS is configured for NAS low priority", "communication apparatus is configured for low priority", "not low priority", "normal priority", "MS is not configured for NAS low priority", "MS is configured for NAS normal priority", "communication apparatus is not configured for low priority", "communication apparatus is configured for normal priority" or the combinations thereof.

In some implementations, processor 422 may use only one back-off timer value for both low priority and normal priority if it determines that the back-off priority indication indicates both low priority and normal priority. In other implementations, processor 422 may use multiple back-off timer values for multiple priority levels. For example, processor 422 may use a first back-off timer value for low priority and a second back-off timer value for normal priority. The first back-off timer value and the second back-off timer value may be identical or may be different.

In some implementations, a request message received by network apparatus 420 may include but not be limited to an EPS Mobility Management (EMM) message such as an attach request message, a tracking area update (TAU) message, a routing area update (RAU) message or a service request (SR) message and an EPS Session Management (ESM) message such as a PDN connectivity request message, a bearer resource modification request message, a bearer resource allocation request message. These messages may also be used to carry a priority indicator indicating either low priority (e.g., MS is configured for NAS low priority) or normal priority (e.g., MS is not configured for NAS low priority) in a device properties IE. In response to these request messages, network apparatus 420 may be configured to send a response message (e.g., a reject message) with a back-off priority indication according to the implementations of the present disclosure.

In some implementations, processor 422 may use a new information element (IE) or in an existing IE to include the back-off priority indication in a response message (e.g., a reject message). A new IE can be either a protocol specific or a common IE for all NAS protocol layers. For backward capability consideration, the new IE can be optional and therefore be possibly ignored by old devices. An existing IE can be a spare bit in use. Possible existing IE candidates could be, for example and without limitation, an extended EMM cause IE, a device properties IE or a re-attempt indicator IE.

Figure 5:
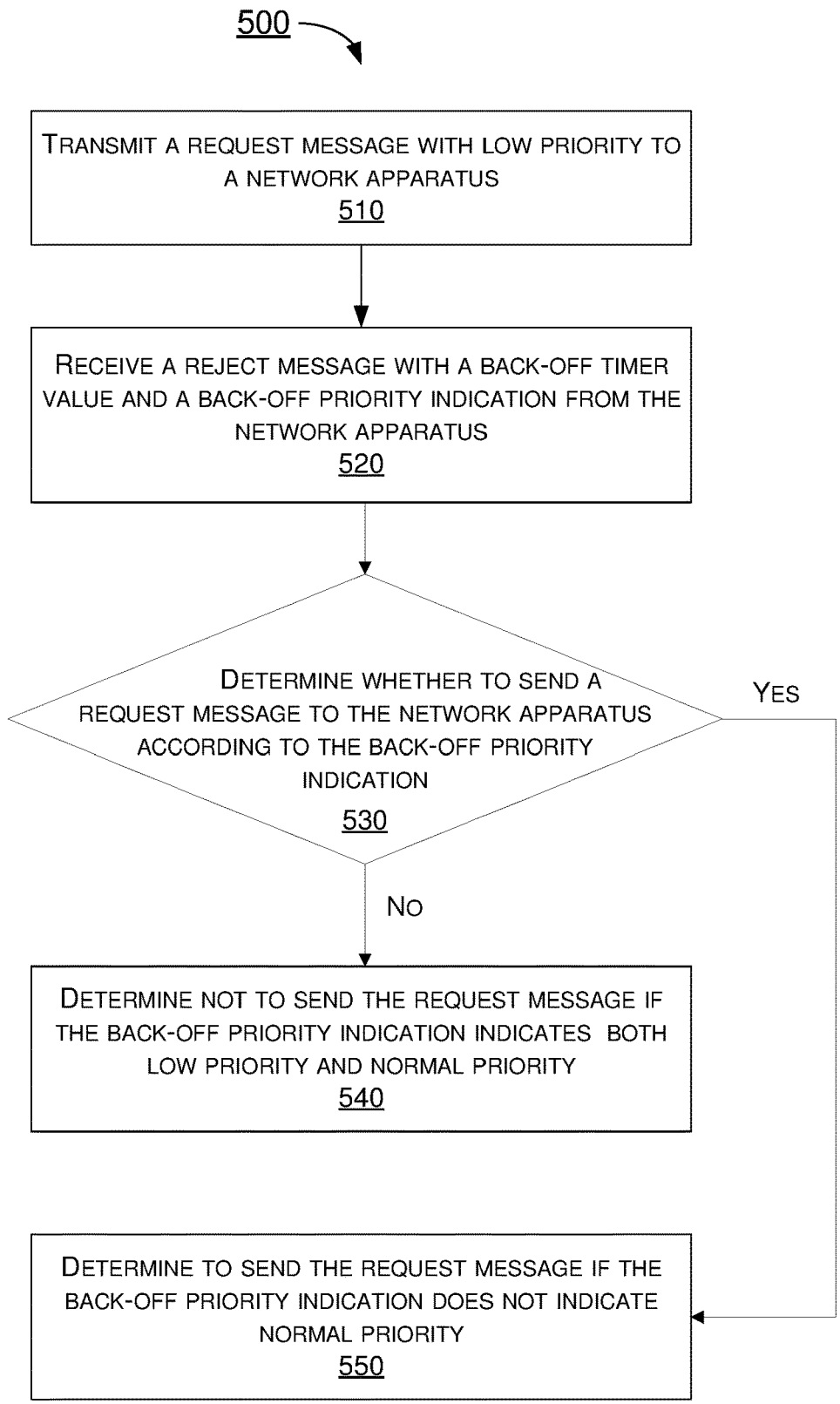
FIG. 5 is a flowchart of an example process in accordance with an implementation of the present disclosure.

FIG. 5 illustrates an example process 500 in accordance with an implementation of the present disclosure. Process 500 may be an example implementation of one, some or all of scenarios 100, 200 and 300, whether partially or completely, with respect to congestion control handling and back-off mechanism in accordance with the present disclosure. Process 500 may represent an aspect of implementation of features of communication apparatus 410. Process 500 may include one or more operations, actions, or functions as illustrated by one or more of blocks 510, 520, 530, 540 and 550. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410. Process 500 may begin at block 510.

At 510, process 500 may involve communication apparatus 410 transmitting a request message with low priority to a network apparatus. Process 500 may proceed from 510 to 520.

At 520, process 500 may involve communication apparatus 410 receiving a reject message with a back-off timer value and a back-off priority indicator from the network apparatus. The back-off priority indication indicates a level of priority to apply the back-off timer value. In some implementations, process 500 may involve communication apparatus 410 storing the back-off timer value in memory 414 and initiate a timer with the back-off timer value. Process 500 may proceed from 520 to 530.

At 530, process 500 may involve communication apparatus 410 determining whether to send a request message to the network apparatus according to the back-off priority indication. If no, process 500 may proceed from 530 to 540. If yes, process 500 may proceed from 530 to 550.

At 540, process 500 may involve communication apparatus 410 determining not to send the request message if the back-off priority indication indicates both low priority and normal priority. When the back-off priority indication indicates both low priority and normal priority, it means that the back-off timer is applied to both low priority and normal priority. Communication apparatus 410 is prohibited from sending a request message before the back-off timer is expired. In some implementations, the back-off priority indication may indicate any priority. This means that the back-off timer is applied to all types of priority level. Communication apparatus 410 is prohibited from sending a request message before the back-off timer is expired. Process 500 may involve communication apparatus 410 determining not to send the request message if the back-off priority indication indicates any priority.

At 550, process 500 may involve communication apparatus 410 determining to send the request message if the back-off priority indication does not indicate normal priority. When the back-off priority indication does not indicate normal priority (i.e., only indicate low priority), it means that the back-off timer does not applied to normal priority apparatus. Process 500 may involve communication apparatus 410 determining to send a further request message with normal priority to the network apparatus.

In some implementations, the low priority indicator may be set to, for example and without limitation, "low priority", "MS is configured for NAS low priority" or "communication apparatus is configured for low priority". The normal priority indicator may be set to, for example and without limitation, "not low priority", "normal priority", "MS is not configured for NAS low priority", "MS is configured for NAS normal priority", "communication apparatus is not configured for low priority" or "communication apparatus is configured for normal priority".

In some implementations, communication apparatus 410 may receive only one back-off timer value for both low priority and normal priority if a back-off priority indication indicates both low priority and normal priority. In other implementations, communication apparatus 410 may receive multiple back-off timer values for multiple priority levels. For example, communication apparatus 410 may receive a first back-off timer value for low priority and a second back-off timer value for normal priority. The first back-off timer value and the second back-off timer value may be identical or may be different.

In some implementations, a request message transmitted by communication apparatus 410 may include but not be limited to an EPS Mobility Management (EMM) message such as an attach request message, a tracking area update (TAU) message, a routing area update (RAU) message or a service request (SR) message and an EPS Session Management (ESM) message such as a PDN connectivity request message, a bearer resource modification request message, a bearer resource allocation request message. These messages may also be configured to carry a priority indicator indicating either low priority (e.g., MS is configured for NAS low priority) or normal priority (e.g., MS is not configured for NAS low priority) in a device properties IE. In response to these request messages, communication apparatus 410 may receive a response message (e.g., a reject message) with a back-off priority indication according to the implementations of the present disclosure.

Figure 6:
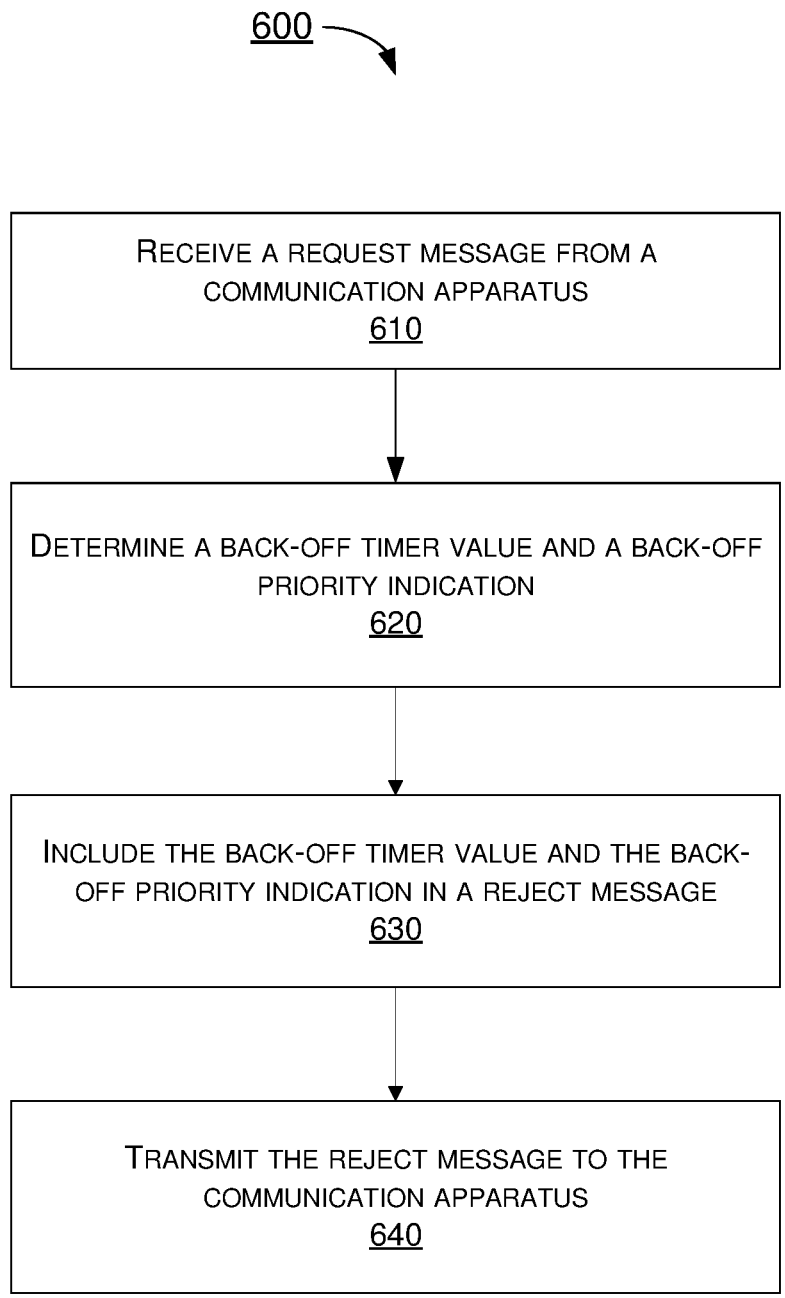
FIG. 6 is a flowchart of an example process in accordance with an implementation of the present disclosure.

FIG. 6 illustrates an example process 600 in accordance with an implementation of the present disclosure. Process 600 may be an example implementation of one, some or all of scenarios 100, 200 and 300, whether partially or completely, with respect to random access probing enhancement during state mismatch in accordance with the present disclosure. Process 600 may represent an aspect of implementation of features of network apparatus 420. Process 600 may include one or more operations, actions, or functions as illustrated by one or more of blocks 610, 620, 630 and 640. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may be implemented by network apparatus 420 or any suitable network node. Solely for illustrative purposes and without limitation, process 600 is described below in the context of network apparatus 420. Process 600 may begin at block 610.

At 610, process 600 may involve network apparatus 420 receiving a request message from a communication apparatus. Process 600 may proceed from 610 to 620.

At 620, process 600 may involve network apparatus 420 determining a back-off timer value and a back-off priority indication. The back-off priority indication is used to indicate a level of priority to apply the back-off timer value and may be determined according to the work load of network apparatus 420. Process 600 may proceed from 620 to 630.

At 630, process 600 may involve network apparatus 420 including the back-off timer value and the back-off priority indication in a reject message. Process 600 may proceed from 630 to 640.

At 640, process 600 may involve network apparatus 420 transmitting the reject message to the communication apparatus.

In some implementations, when network apparatus 420 is busy and is in serious congestion, process 600 may involve network apparatus 420 determining that the back-off priority indication indicates both low priority and normal priority. This means that the back-off timer value is applied to both low priority devices and normal priority devices. The communication apparatus is prohibited from sending a further request message to network apparatus 420 before the back-off timer is expired.

In some implementations, process 600 may involve network apparatus 420 determining that the back-off priority indication indicates any priority. This means that the back-off timer value is applied to all types of priority level. The communication apparatus is prohibited from sending a further request message to network apparatus 420 before the back-off timer is expired.

In some implementations, when network apparatus 420 is busy but still can handle request messages with normal priority, process 600 may involve network apparatus 420 determining that the back-off priority indication does not indicate normal priority (i.e., only indicate low priority). This means that the back-off timer value does not applied to normal priority apparatus. The communication apparatus is able to send a request message with normal priority to network apparatus 420.

In some implementations, process 600 may involve network apparatus 420 receiving a first request message with low priority from a first communication apparatus and receiving a second request message with normal priority from a second communication apparatus. Process 600 may involve network apparatus 420 determining that the first communication apparatus is a machine type device and transmitting a reject message to the first communication apparatus. The reject message includes a back-off timer value and a back-off priority indication indicating both low priority and normal priority. Process 600 may involve network apparatus 420 determining that the second communication apparatus is a human operated device and transmitting an accept message to the second communication apparatus.

In some implementations, the back-off priority indication may indicate, for example and without limitation, "low priority", "MS is configured for NAS low priority", "communication apparatus is configured for low priority", "not low priority", "normal priority", "MS is not configured for NAS low priority", "MS is configured for NAS normal priority", "communication apparatus is not configured for low priority", "communication apparatus is configured for normal priority" or the combinations thereof.

In some implementations, process 600 may involve network apparatus 420 using only one back-off timer value for both low priority and normal priority if determining that the back-off priority indication indicates both low priority and normal priority. In other implementations, process 600 may involve network apparatus 420 using multiple back-off timer values for multiple priority levels. For example, process 600 may involve network apparatus 420 using a first back-off timer value for low priority and a second back-off timer value for normal priority. The first back-off timer value and the second back-off timer value may be identical or may be different.

In some implementations, a request message received by network apparatus 420 may include but not be limited to an EPS Mobility Management (EMM) message such as an attach request message, a tracking area update (TAU) message, a routing area update (RAU) message or a service request (SR) message and an EPS Session Management (ESM) message such as a PDN connectivity request message, a bearer resource modification request message, a bearer resource allocation request message. These messages may also be used to carry a priority indicator indicating either low priority (e.g., MS is configured for NAS low priority) or normal priority (e.g., MS is not configured for NAS low priority) in a device properties IE. In response to these request messages, process 600 may involve network apparatus 420 transmitting a response message (e.g., a reject message) with a back-off priority indication according to the implementations of the present disclosure.

In some implementations, process 600 may involve network apparatus 420 using a new information element (IE) or in an existing IE and including the back-off priority indication in a response message (e.g., a reject message). A new IE can be either a protocol specific or a common IE for all NAS protocol layers. For backward capability consideration, the new IE can be optional and therefore be possibly ignored by old devices. An existing IE can be a spare bit in use. Possible existing IE candidates could be, for example and without limitation, an extended EMM cause IE, a device properties IE or a re-attempt indicator IE.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
transmitting, by a communication apparatus, a request message with a first priority level;
receiving, by the communication apparatus, a reject message with a back-off timer value and a back-off priority indication;
determining, by the communication apparatus, whether the back-off priority indication indicates both the first priority level and a second priority level; and
refraining, by the communication apparatus, from transmitting a new request message with the first or the second priority level before expiration of a back-off timer to which the back-off timer value is applied responsive to the back-off priority indication indicating both the first priority level and the second priority level,
wherein the first priority level is low priority and the second priority level is higher than the first priority level and not low priority.

2. The method of claim 1, wherein the refraining from transmitting the new request message with the second priority level comprises:
applying the back-off timer value for both the first priority level and the second priority level.

3. The method of claim 1, further comprising:
transmitting, by the communication apparatus, another request message with the first or the second priority level after expiration of the back-off timer responsive to the back-off priority indication indicating both the first priority level and the second priority level.

4. The method of claim 1, further comprising:
transmitting, by the communication apparatus, the new request message with the second priority level responsive to the back-off priority indication indicating the first priority level but not the second priority level.

5. A communication apparatus, comprising:
a transceiver capable of wirelessly communicating with a network apparatus; and
a processor capable of:
transmitting, via the transceiver, a request message with a first priority level;
receiving, via the transceiver, a reject message with a back-off timer value and a back-off priority indication;
determining whether the back-off priority indication indicates both the first priority level and a second priority level; and
refraining from transmitting a new request message with the first or the second priority level before expiration of a back-off timer to which the back-off timer value is applied responsive to the back-off priority indication indicating both the first priority level and the second priority level,
wherein the first priority level is low priority and the second priority level is higher than the first priority level and not low priority.

6. The communication apparatus of claim 5, wherein, in refraining from transmitting the new request message with the first or the second priority level, the processor applies the back-off timer value for both the first priority level and the second priority level.

7. The communication apparatus of claim 5, wherein the processor is further configured to transmit another request message with the first or the second priority level after expiration of the back-off timer responsive to the back-off priority indication indicating both the first priority level and the second priority level.

8. The communication apparatus of claim 5, wherein the processor is further configured to transmit the new request message with the second priority level responsive to the back-off priority indication indicating the first priority level but not the second priority level.

9. A method, comprising:
receiving, by a network apparatus, a request message with a first priority level from a communication apparatus;
determining, by the network apparatus, a type of device to which the communication apparatus belongs;
determining, by the network apparatus, a back-off timer value and a back-off priority indication based on the type of device to which the communication apparatus belongs;
generating, by the network apparatus, a reject message that includes the back-off timer value and the back-off priority indication; and
transmitting, by the network apparatus, the reject message to the communication apparatus,
wherein, responsive to the communication apparatus being determined to be a first type of device, the back-off priority indication indicates both the first priority level and a second priority level higher than the first priority level such that the communication apparatus is prohibited from transmitting any request message with the first priority level or the second priority level before expiration of a back-off timer at the communication apparatus to which the back-off timer value is applied.

10. The method of claim 9, wherein, responsive to the communication apparatus being determined to be a second type of device different from the first type, the back-off priority indication indicates the first priority level but not the second priority level higher than the first priority level such that the communication apparatus is permitted to transmit a new request message with the second priority level before expiration of a back-off timer at the communication apparatus to which the back-off timer value is applied.

11. The method of claim 10, wherein the determining of the type of device to which the communication apparatus belongs comprises determining whether the communication apparatus is the first type of device or a second type of device based on the request message.

12. The method of claim 11, wherein the first type of device comprises a machine type device, and wherein the second type of device comprises a human operated device.

13. A network apparatus, comprising:
a transceiver capable of wirelessly communicating with a communication apparatus; and
a processor capable of:
receiving, via the transceiver, a request message from the communication apparatus;
determining a type of device to which the communication apparatus belongs;
determining a back-off timer value and a back-off priority indication based on the type of device to which the communication apparatus belongs;
generating a reject message that includes the back-off timer value and the back-off priority indication; and
transmitting, via the transceiver, the reject message to the communication apparatus,
wherein, responsive to the communication apparatus being determined to be a first type of device, the back-off priority indication indicates both the first priority level and a second priority level higher than the first priority level such that the communication apparatus is prohibited from transmitting any request message with the first priority level or the second priority level before expiration of a back-off timer at the communication apparatus to which the back-off timer value is applied.

14. The network apparatus of claim 13, wherein, responsive to the communication apparatus being determined to be a second type of device different from the first type, the processor accepts the request message.

15. The network apparatus of claim 14, wherein, in determining the type of device to which the communication apparatus belongs, the processor is capable of determining whether the communication apparatus is the first type of device or a second type of device based on the request message.

16. The network apparatus of claim 15, wherein the first type of device comprises a machine type device, and wherein the second type of device comprises a human operated device.

* * * * *